(12) United States Patent
Cuppari et al.

(10) Patent No.: US 10,755,315 B2
(45) Date of Patent: Aug. 25, 2020

(54) DISTRIBUTED PROMOTION MANAGEMENT

(71) Applicant: The Coca-Cola Company, Atlanta, GA (US)

(72) Inventors: Scott Cuppari, Smyrna, GA (US); Davinder Sawhney, Atlanta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 872 days.

(21) Appl. No.: 14/865,477

(22) Filed: Sep. 25, 2015

(65) Prior Publication Data
US 2016/0092931 A1 Mar. 31, 2016

Related U.S. Application Data

(60) Provisional application No. 62/055,925, filed on Sep. 26, 2014.

(51) Int. Cl.
*G06Q 30/02* (2012.01)
*B67D 1/08* (2006.01)

(52) U.S. Cl.
CPC ....... *G06Q 30/0269* (2013.01); *B67D 1/0877* (2013.01); *B67D 1/0888* (2013.01)

(58) Field of Classification Search
CPC . G06Q 30/0269; B67D 1/0877; B67D 1/0888
USPC ......... 705/14.35, 14.25, 14.19, 14.55, 14.66, 705/834; 700/236; 1/1; 715/814; 235/380
See application file for complete search history.

(56) References Cited

U.S. PATENT DOCUMENTS

| | | | | |
|---|---|---|---|---|
| 9,245,402 B2* | 1/2016 | Green | ........................ | G07F 7/00 |
| 9,646,314 B2* | 5/2017 | Moore | .................... | G06Q 30/02 |
| 9,691,212 B2* | 6/2017 | Green | ........................ | G07F 7/00 |
| 2001/0032036 A1* | 10/2001 | Sudolcan | ............. | B67D 1/0888 |
| | | | | 700/236 |
| 2007/0073589 A1* | 3/2007 | Vergeyle | ................ | G06Q 30/02 |
| | | | | 705/14.19 |
| 2008/0308626 A1* | 12/2008 | Harper | .................... | G06K 19/08 |
| | | | | 235/380 |
| 2010/0320266 A1* | 12/2010 | White | ..................... | G06Q 20/20 |
| | | | | 235/375 |
| 2012/0123865 A1* | 5/2012 | Salzano | ............. | G06Q 30/0257 |
| | | | | 705/14.55 |

(Continued)

FOREIGN PATENT DOCUMENTS

WO    WO-2008063987 A2 *  5/2008  ........... G06F 16/437

OTHER PUBLICATIONS

Kevan Lee, How Content Promotion Works for Blogs Big and Small: Our 11 Favorite Content Distribution Strategies, 2015 (Year: 2015).*

*Primary Examiner* — Tarek Elchanti

(57) ABSTRACT

Technologies are provided herein for distributed promotion management. According to a method for distributed promotion management, a device identification may be provided by a consumer electronic device that may comprise a dispensing device. An event notification may be received at the consumer electronic device. The event notification may be based upon the provided device identification. A promotional screen may then be displayed. The promotional screen may comprise a limited time offer section displaying a limited time offer. The limited time offer may be based on the received event notification.

18 Claims, 15 Drawing Sheets

(56) References Cited

U.S. PATENT DOCUMENTS

| | | | |
|---|---|---|---|
| 2013/0006742 A1* | 1/2013 | Richard | G06Q 30/0236 705/14.25 |
| 2013/0032634 A1* | 2/2013 | McKirdy | G16H 40/67 235/375 |
| 2013/0167231 A1* | 6/2013 | Raman | H04L 63/1416 726/23 |
| 2015/0039776 A1 | 2/2015 | Jarnagin et al. | |
| 2015/0046877 A1* | 2/2015 | Cuppari | B67D 1/0015 715/834 |
| 2015/0082243 A1 | 3/2015 | Taylor et al. | |
| 2015/0358819 A1* | 12/2015 | Dipaola | H04W 12/06 726/7 |
| 2016/0092931 A1* | 3/2016 | Cuppari | G06Q 30/0269 705/14.66 |

\* cited by examiner

DISTRIBUTED PROMOTION MANAGEMENT

CROSS-REFERENCE TO RELATED APPLICATION

This application claims the benefit of U.S. Provisional Application No. 62/055,925, filed Sep. 26, 2014, the entire contents of which are hereby incorporated by reference herein.

TRADEMARKS

COCA-COLA® is a registered trademark of The Coca-Cola Company, Atlanta, Ga., U.S.A. Other names, symbols, designs, or logos used herein may be registered trademarks, trademarks, or product names of The Coca-Cola Company or other companies.

BACKGROUND

A beverage dispenser is a device that dispenses carbonated soft drinks called fountain drinks. They may be found in restaurants, concession stands, and other locations such as convenience stores. A beverage dispenser combines flavored syrup or syrup concentrate and carbon dioxide with chilled water to make soft drinks. The syrup may be pumped from a special container called a bag-in-box (BIB).

SUMMARY

This Summary is provided to introduce a selection of concepts in a simplified form that may be further described below in the Detailed Description. This Summary is not intended to be used to limit the scope of the claimed subject matter.

According to embodiments, distributed promotion management may be provided. First, a device identification may be provided by a consumer electronic device that may comprise a dispensing device. Then, an event notification may be received at the consumer electronic device. The event notification may be based upon the provided device identification. A promotional screen may then be displayed. The promotional screen may comprise a limited time offer section displaying a limited time offer. The limited time offer may be based on the received event notification.

According to embodiments, distributing software from a software distribution system may be provided. First, a record of attributes for each device in a plurality of devices may be maintained and a group of software modules may be maintained. Then a first plurality of software modules may be distributed to a first device within the plurality of devices. The first plurality of software modules may be selected from the group of software modules based on attributes associated with the first device. And a second plurality of software modules may be distributed to a second device within the plurality of devices. The second plurality of software modules may be selected from the group of software modules based on attributes associated with the second device.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Figure 1:
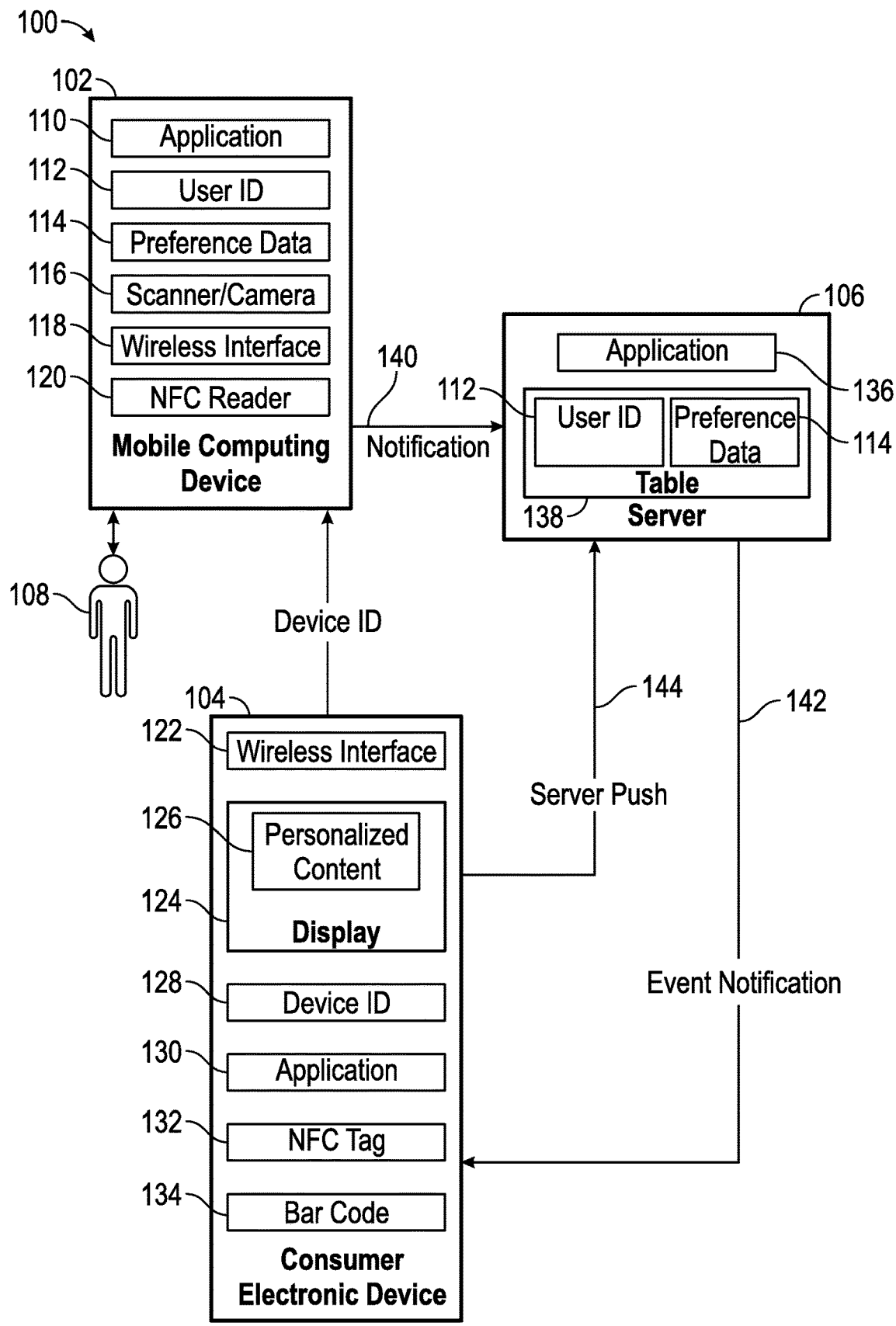
FIG. 1 shows a block diagram of a network architecture.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Distributed promotion management may be provided. Consistent with embodiments, a user may read a device ID from a consumer electronic device (e.g. a beverage dispenser, kiosk, ATM, etc.) with a mobile device. The mobile device may send the device ID along with a user ID to a server in a notification from the mobile device. Using the user ID, the server may look up user preferences from a table on the server. Consistent with embodiments, rather than looking the user preferences up on the server, the user preferences may be sent from the mobile device to the server. The server may send the user preferences to the consumer electronic device that corresponds to the device ID. In response, the consumer electronic device may display a promotional screen based upon the user preferences.

FIG. 1 shows a network architecture 100 for facilitating an individualized interaction between a mobile computing device and an electronic device. As shown in FIG. 1, network architecture 100 may include a mobile computing device 102, a consumer electronic device 104, and a server 106. Mobile computing device 102 may be utilized by a user 108 and may be in communication with consumer electronic device 104 and server 106. The aforementioned network architecture for facilitating an individualized interaction between a mobile computing device and an electronic device may be described in related patent application U.S. Ser. No. 61/860,634 entitled "Facilitating Individualized User Interaction with an Electronic Device," filed on Jul. 31, 2013, the disclosure of which is incorporated herein, in its entirety, by reference.

Computing device 102 may include a computing device application 110, a user ID 112, preference data 114, a scanner/camera 116, a mobile computing device wireless interface 118, and a near field communication (NFC) reader 120. Computing device 102 may comprise, but is not limited to, a smartphone, a tablet computer, or a laptop computer that may be capable of executing one or more software application programs, such as application 110. Computing device 102 may be practiced in a computing environment 1400 described below with respect to FIG. 14.

Consumer electronic device 104 may comprise a consumer electronic device wireless interface 122 and a display 124 that may provide personalized content 126. Consumer electronic device 104 may further comprise a device ID 128, a consumer electronic device application 130, an NFC tag 132, and a bar code 134. Bar code 134 may comprise any machine-readable object (e.g. one-dimensional (1-D) or two-dimensional (2-D)) that may provide data relating to consumer electronic device 104. Consumer electronic device 104 may be practiced in an operating environment such as an electronic device 1500 as described with respect to FIG. 15.

Server 106 may comprise a server application 136 and a table 138. Table 138 may store preference data 114 related to user ID 112. Server 106 may be practiced in an operating environment such as electronic device 1500 as described with respect to FIG. 15.

Scanner/camera 116 and may be capable of short range wireless communication via wireless interface 118. Wireless interface 118 may be configured to provide short range wireless communications via, but not limited to, NFC, BLUETOOTH wireless technology, and Wi-Fi. Preference data 114 may also be stored on server 106 or in a database accessible via server 106 and cross-referenced (e.g. via table 138) with user ID 112. User ID 112 may comprise an ID for user 108 of mobile computing device 102. Preference data 114 may comprise preferences associated with user 108. For example, preference data 114 may comprise a list of user 108's favorite beverages, games, products, and/or restaurants, a list of user 108's custom beverage mixes, and/or other information that can be used to personalize user 108's interaction with consumer electronic device 104.

Application 110 may be configured to send user ID 112 and preference data 114 along with device ID 128 (e.g. retrieved from consumer electronic device 104) in a notification 140 to server 106 for conducting an individualized or unique interaction with consumer electronic device 104. Notification 140 may only include user ID 112 and device ID 128. Upon receipt of device ID 128 and user ID 112, server 106 may obtain and communicate preference data 114 (e.g. or a subset thereof) to consumer electronic device 104.

Upon receiving device ID 128, server 106 may determine that mobile device 102 (and hence user 108 of mobile device 102) may be proximate to consumer electronic device 104. Depending on how device ID 128 is obtained (e.g. scanning a barcode from consumer electronic device 104 or reading an NFC tag associated with consumer electronic device 104), server 106 may further determine that user 108 is addressing or is otherwise ready to commence interaction with consumer electronic device 104. This may be opposed to user 108 being in line to use consumer electronic device 104, but not yet being ready to commence interaction with consumer electronic device 104.

Device ID 128 may be retrieved without establishing a communication session between mobile device 102 and consumer electronic device 104. For example, device ID 128 may be retrieved by using scanner/camera 116 in conjunction with application 110 to scan a barcode (e.g. a 1-D or 2-D barcode) or other symbol encoded with device ID 128 on consumer electronic device 104 (or displayed on display 124.) In other words, the barcode or other symbol may be rendered on display 124 of consumer electronic device 104, or printed, embossed, shown on a sticker, or otherwise made visible on one or more surfaces of consumer electronic device 104.

Device ID 128 may be retrieved by NFC reader 120 reading device ID 128 from NFC tag 132. NFC tag 132 may be a passive or an active NFC tag that may store device ID 128. NFC tag 30 may comprise an RFID tag where the ID associated with the RFID tag may comprise device ID 128. NFC tag 132 may be placed inside a cabinet containing consumer electronic device 104 at a location such that NFC reader 120 on mobile computing device 102 may still read NFC tag 132. By placing NFC tag 132 inside the cabinet, NFC tag 132 may be protected from tampering.

Device ID 128 may be retrieved by initiating a communication session between mobile computing device 102 and consumer electronic device 104. For example, mobile computing device 102 may communicate via a wireless communication session (e.g. between mobile computing device wireless interface 118 and consumer electronic device wireless interface 122) with consumer electronic device 104 using BLUETOOTH wireless technology, Wi-Fi or other wireless communication standards or technologies.

Consistent with embodiments, preference data 114 may be communicated directly from mobile computing device 102 to consumer electronic device 104 via a communications session between mobile computing device wireless interface 118 and consumer electronic device wireless interface 122. For example, application 110 may pass preference data 114 to application 130 upon establishment of a communications session. Consumer electronic device 104 may comprise a computing device capable of executing one or more software application programs such as application 130. Consumer electronic device 104 may also be configured to provide any number of consumer services and/or products, including, without limitation, the dispensing of food and/or beverage products, video gaming services, video services, advertisement services, financial services, etc. Consumer electronic device 104 may include fountain or post-mix beverage dispensing machines, vending machines, public gaming devices, automated teller machines or any other electronic device or kiosk configured to provide consumer products and/or services.

Similar to wireless interface 118 in mobile computing device 102, wireless interface 122 in consumer electronic device 104 may be configured to provide short range wireless communications via NFC, BLUETOOTH wireless technology, Wi-Fi or other wireless technologies. Consumer electronic device 104 may be utilized to display personalized content 126 to user 108 based on preference data 114. For example, personalized content 126 may include a selection of user 108's favorite beverages that may be available for purchase, advertisements targeted towards user 108's favorite products, etc.

Device ID 128 may comprise a unique identification of consumer electronic device 104. Device ID 128 may be utilized for identifying consumer electronic device 104 among other similar devices in a network. Application 130 may be configured to send device ID 128 to mobile computing device 102 in response to a communication session initiated by user 108. As discussed above, the communication session may comprise a short range wireless communication session during which device ID 128 may be sent to mobile computing device 102. For example, device ID 128 may be encoded in an unpowered NFC tag 132 that may be affixed to consumer electronic device 104. Device ID 128 may be communicated when user 108 touches or brings mobile computing device 102 in close proximity with NFC tag 132.

Device ID 128 may comprise stored data on consumer electronic device 104 and may be communicated in response to a data request made by user 108 during a Wi-Fi or BLUETOOTH wireless technology session with mobile computing device 102. In addition, the communication session may comprise a scanning session initiated by user 108. For example, device ID 128 may be encoded in a 1-D or 2-D barcode (e.g. a QR code) or other symbol that may be either physically affixed to consumer electronic device 104 or displayed by consumer electronic device 104 on display 124.

Application 130, executing on consumer electronic device 104, may be configured to receive an event notification 142 from server 106. Event notification 142 may include, for example, user ID 112 and preference data 114. Event notification 142 may be sent after user ID 112, device ID 128, and preference data 114 are received by server 106. Communication between application 130 on consumer electronic device 104 and application 136 on server 106 may be configured to utilize a server push technique in which a communication session (i.e. a server push 144) may be initiated and established by consumer electronic device 104 prior to user 108's interaction with consumer electronic device 104. Server push technology may include, but is not limited to, long polling, Comet, web sockets or Berkeley socket ("BSD") techniques. Server 106 may hold the sending of a response to data requests from consumer electronic device 104 until the requested data is available or a predetermined timeout event has occurred. Upon user ID 112 and preference data 114 being received by consumer electronic device 104, application 130 may be configured to display personalized content 126 for user 108 on display 124.

Server 106, which may be in communication with mobile computing device 102 and consumer electronic device 104, may comprise a computing device capable of executing one or more software application programs such as application 136. Communication between server 106, mobile computing device 102, and consumer electronic device 104 may take place via respective device network connections (not shown) over a wide area network, such as the Internet. Server 106 may comprise a non-blocking socket input/output server platform that may utilize a server push technology (e.g. long polling or web sockets) where consumer electronic device 104 may initiate a network connection (e.g. server push 144) with server 106 and keeps it open.

An example of a non-blocking socket input/output server platform may comprise the ELASTIC COMPUTE CLOUD ("EC2") web service (that may comprise an "infrastructure as a service" cloud computing platform) provided by AMAZON.COM, INC. of Seattle, Wash. The EC2 web service may further be utilized with Tornado that may comprise an open source scalable, non-blocking web server and web application framework. Embodiments of the disclosure may also be practiced in conjunction with other non-blocking socket servers and/or platforms from other providers and further, is not limited to any particular application, system, or platform.

Application 136 may be configured to receive user ID 112 and preference data 114 contained in notification 140 from mobile computing device 102 via an HTTP Application Programming Interface ("API"). Application 136 may receive user ID 112 and use table 138 to look up corresponding preference data 114. Application 136 may further be configured to server push communications to consumer electronic device 104. Application 136 may also be configured to delay the sending of responses to the HTTP requests from consumer electronic device 104 until the occurrence of one of a timeout or the receipt of notification 140.

Figure 2:
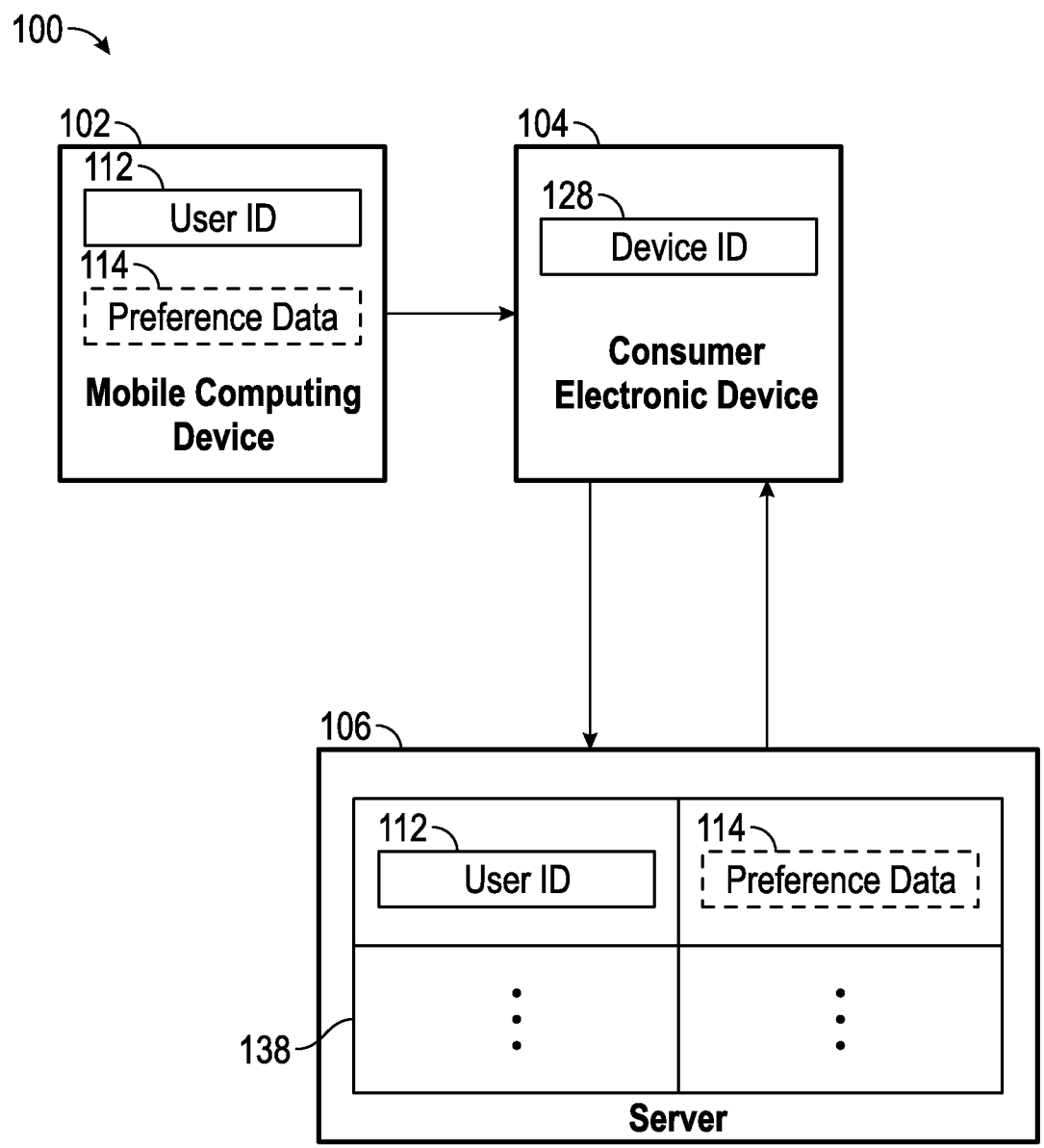
FIG. 2 shows a block diagram of a network architecture.

FIG. 2 shows network architecture 100 for facilitating an individualized interaction between mobile computing device 102 and consumer electronic device 104. Network architecture 100 includes mobile computing device 102 including user ID 112 and, optionally, preference data 114. Mobile computing device 102 may be in active communication with consumer electronic device 104 via BLUETOOTH wireless technology, Wi-Fi or other wireless standards or technologies. Consumer electronic device 104, which may store device ID 128, may receive user ID 112 (and optionally, preference data 114) from mobile computing device 102. Consumer electronic device 104 may then send device ID 128 to server 106 and receive optional preference data 114 from server 106. Server 106 may store table 138 that may include one or more user IDs 112 and, optionally, one or more instances of preference data 114. As discussed above with respect to FIG. 1, preference data 114 may be cross-referenced (e.g. via table 138) with user ID 112.

Figure 3:
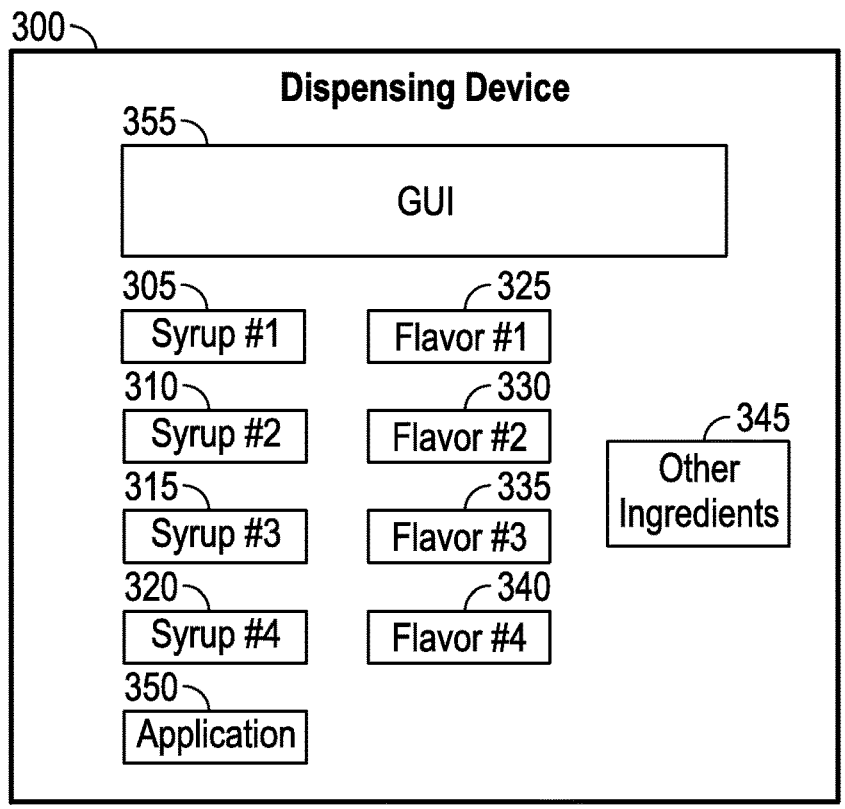
FIG. 3 shows a dispensing device.

FIG. 3 shows a dispensing device 300. Consumer electronic device 104 may comprise, but is not limited to, dispensing device 300. As shown in FIG. 3, dispensing device 300 may comprise various beverage bases or beverage base components such as beverage bases 305, 310, 315, and 320 as well as flavors (i.e. flavoring agents, flavor concentrates, or flavor syrups) 325, 330, 335, and 340. Dispensing device 300 may further comprise other ingredients 345, an application 350, and a graphical user interface (GUI) 355. The aforementioned dispensing device may be described in related patent application U.S. Ser. No. 61/877,549 entitled "Product Categorization User Interface for a Dispensing Device," filed on Sep. 13, 2013, the disclosure of which is incorporated herein, in its entirety, by reference.

Beverage bases 305, 310, 315, and 320 may be concentrated syrups. Beverage bases 305, 310, 315, and 320 may be replaced with or additionally provided with beverage base components. Each of beverage bases 305, 310, 315, and 320 or beverage base components and each of flavors 325, 330, 335, and 340 may be separately stored or otherwise contained in individual removable cartridges that may be stored in dispensing device 300.

Dispensing device 300 may identify the cartridges upon installation by a user or the user may be prompted to identify the cartridges when they are installed. The aforementioned beverage components (i.e. beverage bases or beverage base components and flavors) may be combined, along with other beverage ingredients 345, to dispense various beverages or blended beverages (i.e. finished beverage products) from dispensing device 300. Dispensing device 300 may also be configured to dispense beverage components individually. Dispensing device 300 may be configured to dispense beverage base components to form a beverage base. Other ingredients 345 may include diluents such as still or carbonated water, functional additives, or medicaments, for example. Other ingredients 345 may be installed in dispensing device 300, pumped to dispensing device 300, or both. The carbonated water may be produced in dispensing device 300 through mixing of $CO_2$ and still water such as in a carbonator or other device that produces carbonated water.

Application 350 may be configured to generate GUI 355 on a display screen (not shown) of the dispensing device 300. GUI 355 may be utilized to select and individually dispense one or more beverages from dispensing device 300. The beverages may be dispensed as beverage components in a continuous pour operation where one or more selected beverage components continue to be dispensed while a pour input is actuated by a user or in a batch pour operation whereby a predetermined volume of one or more selected beverage components are dispensed (e.g. one ounce at a time).

GUI 355 on dispensing device 300 may be addressed via a number of methods to select and dispense beverages. For example, the user may interact with GUI 355 via touch input to navigate one or more menus from which to select and dispense a beverage. As another example, the user may type in a code using an onscreen or physical keyboard (not shown) on dispensing device 300 to navigate one or more menus from which to select and dispense a beverage. As yet another example, the user (e.g. user 108) may use mobile computing device 102 to scan a one or two-dimensional barcode (e.g., a QR code) or other symbol shown on a tag or sticker affixed to, printed on dispensing device 300 or displayed on a display (e.g. GUI 355) of the dispensing device 300 to select a beverage for dispensing.

Figure 4:
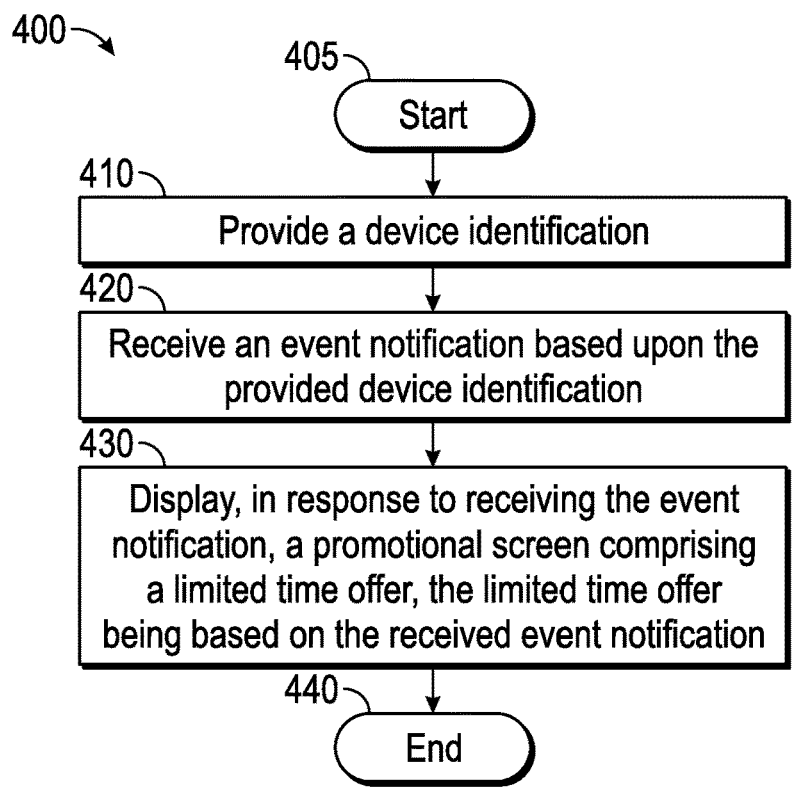
FIG. 4 is a flow chart setting forth the general stages involved in a method for providing distributed promotion management.

FIG. 4 is a flow chart setting forth the general stages involved in a method 400 consistent with an embodiment of the disclosure for providing distributed promotion management. Method 400 may be implemented using network architecture 100 as described above with respect to FIG. 1, FIG. 2, and FIG. 3. Ways to implement the stages of method 400 will be described in greater detail below.

Figure 5:
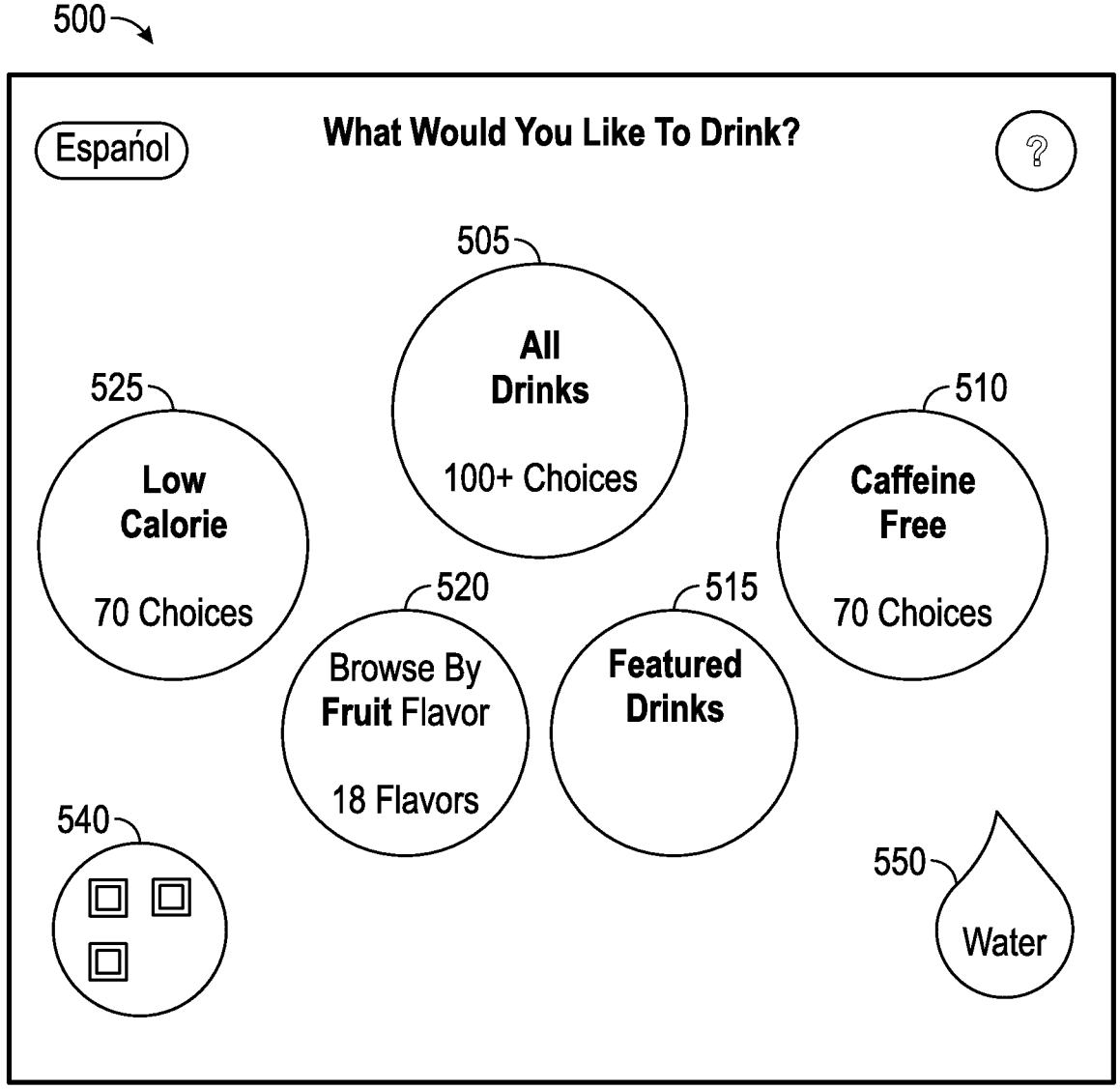
FIG. 5 shows a user interface.

Method 400 may begin at starting block 405 and proceed to stage 410 where consumer electronic device 104 may provide device identification 128. For example, application 130 may display a user interface 500 on display 124. As shown in FIG. 5, user interface 500 may be utilized for selecting a menu associated with different product categories that may be dispensed from consumer electronic device 104. User interface 500 may include a main menu of product categories 505, 510, 515, 520 and 525 that may be selected by user 108. Each of the aforementioned categories may correspond to various product categories such as all of a number of beverage brands available on consumer electronic device 104 (e.g. product category 505), a caffeine-free beverage category (e.g. product category 510), a featured category associated with beverages tied to one or more promotional or advertising campaigns (e.g. product category 515), a flavor category in which beverages are organized corresponding to a particular fruit flavor or other particular flavor additive available on consumer electronic device 104 (e.g. product category 520), and a low-calorie beverage category (e.g. product category 525).

User interface 500 may also include a Help user control 530 that may be selected by user 108 to review instructions for selecting and dispensing a product from consumer electronic device 104. User interface 500 may also include a language toggle user control 535 that may be selected by user 108 to change the language utilized. User interface 500 may also include a bar code 540 that may comprise a one or two-dimensional barcode (e.g. a QR code) or other symbol that may be utilized by user 108 to uniquely identify consumer electronic device 104 so as to enable a customized interaction or enable user 108 to remotely access consumer electronic device 104 from mobile computing device 102. The aforementioned consumer customized interactions and remote access tasks are described in related patent application U.S. Ser. No. 61/863,269 entitled "Dynamically Adjusting Ratios of Beverages in a Mixed Beverage," filed on Aug. 7, 2013, the disclosure of which is incorporated herein, in its entirety, by reference. User interface 500 may also include a user control 550 for directly accessing a product (e.g. water) from the main menu of product categories 505-525. User control 550 may be utilized by a consumer who only wishes to quickly dispense a product without having to navigate through one or more of product categories 505-525.

Figure 6B:
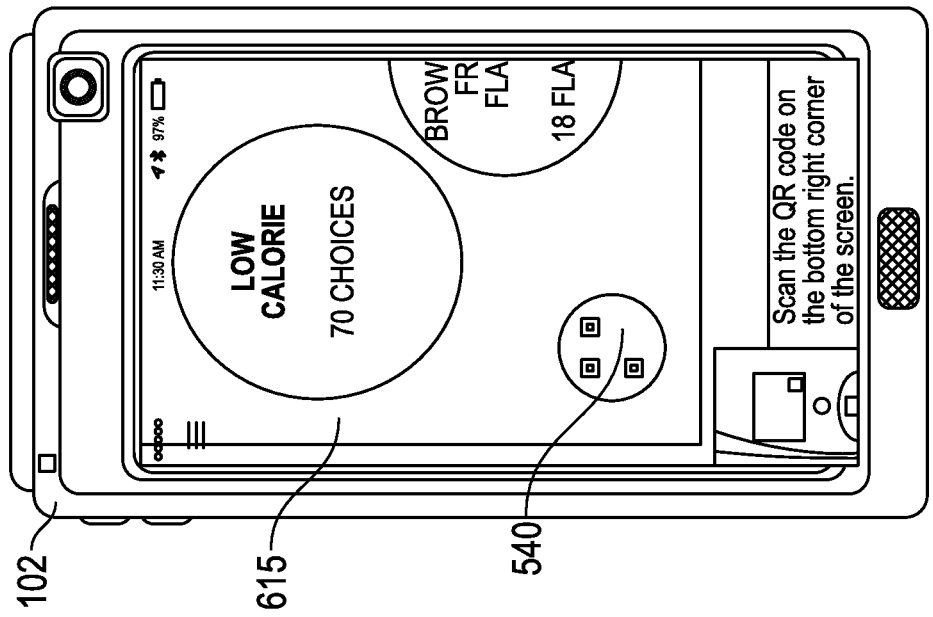
FIG. 6B shows a camera view.
Figure 6A:
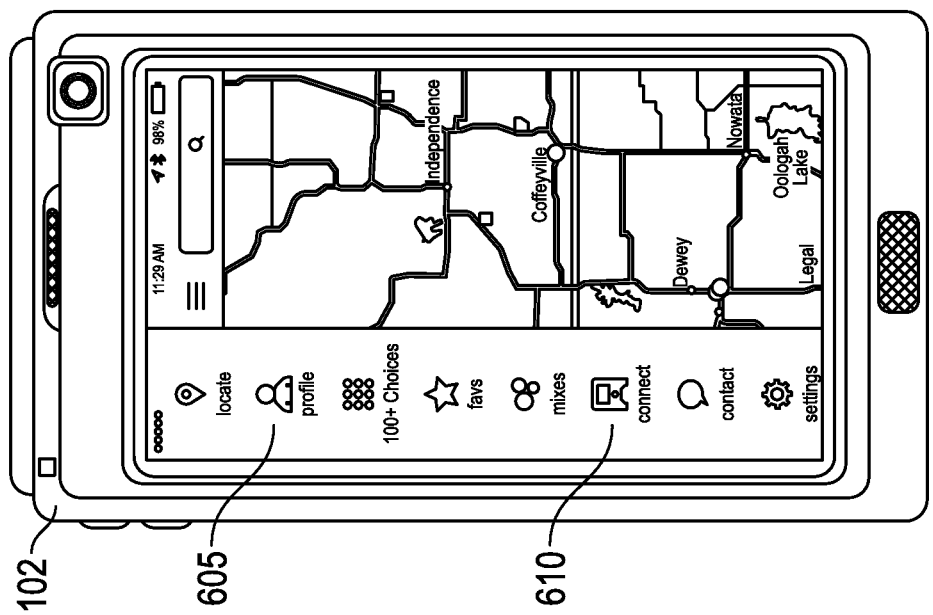
FIG. 6A shows a user interface.
Figure 7:
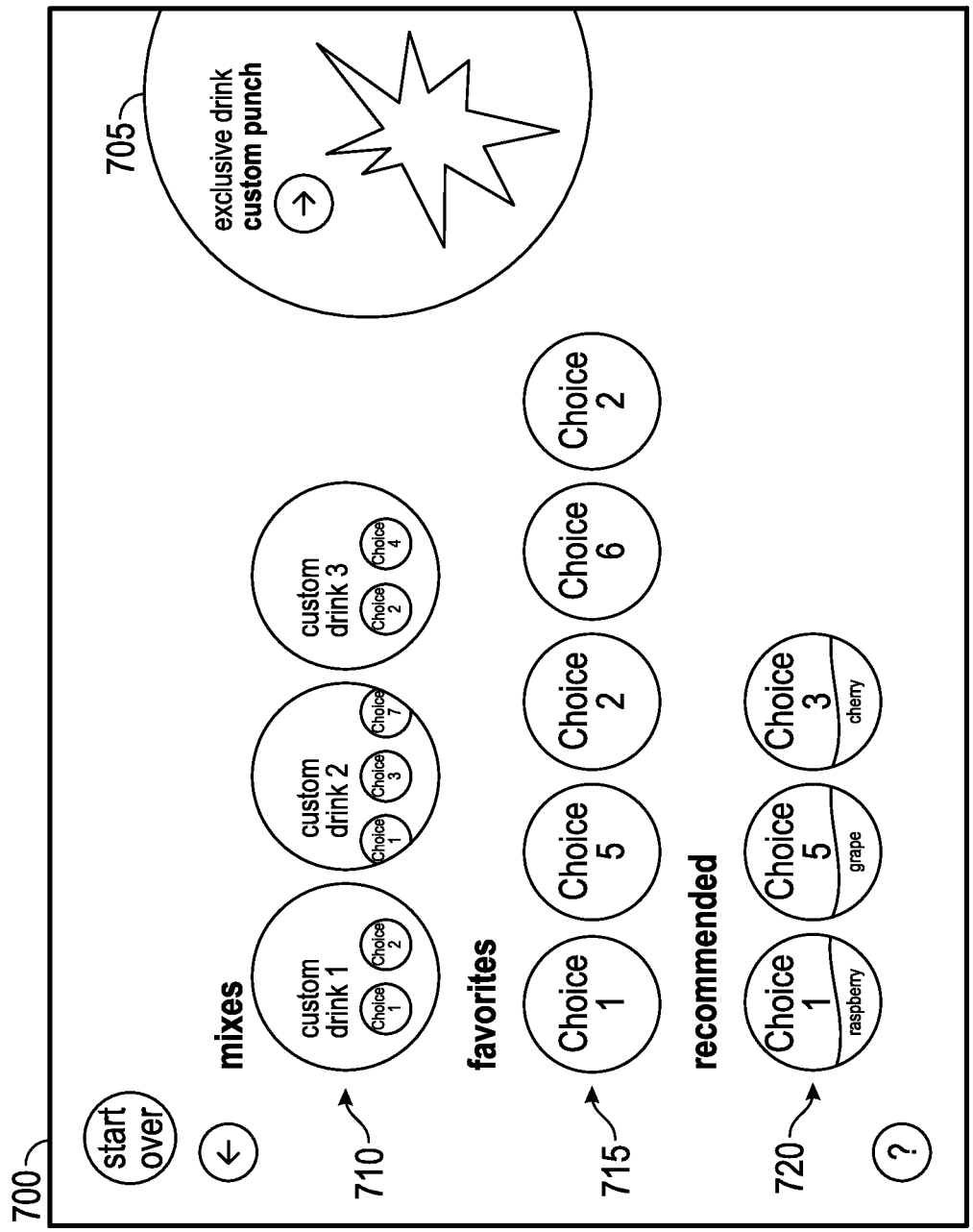
FIG. 7 shows a promotional screen.

From stage 410, where consumer electronic device 104 provides device identification 128 (e.g. in bar code 540), method 400 may advance to stage 420 where consumer electronic device 104 may receive an event notification (e.g. event notification 142) based upon provided device identification 128. For example, user 108 may cause application 110 to execute on mobile computing device 102. As a result, application 110 may cause a user interface 605 to be displayed on mobile computing device 102 as shown in FIG. 6A. User interface 605 may include a plurality of user options including, but not limited to, a connect option 610.

From user interface 605, user 108 may select connect option 610. In response to user 108 selecting connect option 610, application 110 may cause a camera view 615 to be displayed on mobile computing device 102 as shown in FIG. 6B. While in camera view 615, user 108 may point scanner/camera 116 at user interface 500 to cause bar code 540 to be displayed within camera view 615. Once bar code 540 is within camera view 615, user 108 may cause scanner/camera 116 to capture an image of bar code 540. Once the image of bar code 540 is captured, application 110 may process the captured image of bar code 540 to extract device ID 128 stored within bar code 540. As described above with respect to FIG. 1, in response, mobile computing device 102 may send notification 140 to server 106 that may in turn send event notification 142 to consumer electronic device 104. As stated above, event notification 142 may include user ID 112 and preference data 114.

Once consumer electronic device 104 receives event notification 142 based upon provided device identification 128 in stage 420, method 400 may continue to stage 430 where consumer electronic device 104 may display, in response to receiving event notification 142, a promotional screen 700 on display 124. Promotional screen 700 may comprise a limited time offer (LTO) section 705. Limited time offer section 705 may be based on received event notification 142. Consistent with embodiments of the disclosure, limited time offer section 705 may only be displayed within promotional screen 700 when individualized interaction between mobile computing device 102 and electronic device 104 has been established as described above with respect to FIG. 1.

In addition to limited time offer section 705, promotional screen 700 may comprise a custom mixes section 710, a favorites section 715, and a recommended section 720. Each of limited time offer section 705, custom mixes section 710, favorites section 715, and recommended section 720 may include one or more user selectable elements, when selected by user 108, may cause consumer electronic device to dispense a beverage that may correspond to the selected user selectable element.

User selectable elements in limited time offer section 705 may correspond to beverages, brands, or beverage recipes that may be designated by an operator of consumer electronic device 104. User selectable elements in limited time offer section 705 may correspond to beverages that may or may not comprise brand offerings. User selectable elements in limited time offer section 705 may correspond to mixes of one or more brand offerings, beverage bases, beverage base components, flavors, diluents, and/or sweeteners. For example, the operator of consumer electronic device 104 may comprise a movie theater that is promoting a particular movie. Consequently, a user selectable element in limited time offer section 705 may correspond to a beverage related to the promoted movie. In particular, a user selectable element in limited time offer section 705 may correspond to a beverage related to a beverage consumed in the promoted movie. As another example, the operator of consumer electronic device 104 may comprise a restaurant that is promoting a particular food offering. Consequently, a user selectable element in limited time offer section 705 may correspond to a beverage related to the promoted food offering. In particular, a user selectable element in limited time offer section 705 may correspond to a beverage that may enhance or otherwise be related to the promoted food offering.

Additionally, according to some implementations of the technologies presented herein, user selectable elements in limited time offer section 705 may correspond to user selectable items comprising selecting a new drink or beverage mix, sending a drink or beverage recipe to a friend, redeeming a coupon, and/or activating/initializing a loyalty reward redemption. Furthermore, some user selectable items that can be implemented as a limited time offer may include interactive activities such as, for example, playing an interactive game such as "guess that mix" whereby a user attempts to differentiate one or more flavors or brands in a particular recipe. Additional interactive activities can include taking a quiz whereby a user submits one or more answers to questions displayed to the user, and/or learning a fun fact whereby a user is presented interesting information or other information related to a limited time offer or fact from the past.

User selectable elements in custom mixes section 710 may correspond to beverage recipes that user 108 may have designed or otherwise obtained. In other words, user selectable elements in custom mixes section 710 may correspond to beverages that may not comprise brand offerings, but may comprise mixes of one or more brand offerings, beverage bases, beverage base components, flavors, diluents, and/or sweeteners. Recipes for beverages displayed in custom mixes 710 may be stored and obtained by consumer electronic device 104 from preference data 114.

User selectable elements in favorites section 715 may correspond to brand beverage offerings that user 108 may select most often or has other wise designated as favorite beverages. The identification of beverages displayed in favorites section 715 may be stored in preference data 114.

User selectable elements in recommended section 720 may correspond to beverage offerings that an operator of consumer electric device wishes to offer or otherwise suggest that user 108 consume. The recommended beverage offerings corresponding to recommended section 720 may be determined or otherwise calculated based upon user 108's custom mixes and favorites identified in preference data 114. For example, application 130 (running on consumer electronic device 104) or application 136 (running on server 106) may run a recommendation process that may calculate beverage recommendations for recommended section 720 based upon user 108's preference data 114 (e.g. user 108's custom mixes and/or favorites.) After consumer electronic device 104 displays, in response to receiving event notification 142, promotional screen 700 in stage 430, method 400 may then end at stage 440.

Consistent with embodiments of the disclose, the operator of consumer electronic device 104 may be able to select when promotional screen 700 may be displayed on display 124 and/or which sections of user interface 700 may be displayed on display 124. For example, the choices provided by promotional screen 700 may cause potential users of consumer electronic device 104 to backup and have to wait. This may cause business issues for the operator of consumer electronic device 104 who may wish to turn off the ability for consumer electronic device 104 to provide promotional screen 700. Or the operator of consumer electronic device 104 may wish to turn off the ability for consumer electronic device 104 to provide promotional screen 700 during certain time periods and to turn on the ability for consumer electronic device 104 to provide promotional screen 700 during other time periods. For example, for on-peak time periods, the operator may wish to turn off promotional screen 700 in order to improve operational efficiency. However, during off-pear time periods, the operator may wish to turn on promotional screen 700 because it may drive business in because consumers may wish to engage with promotional screen 700.

Figure 8:
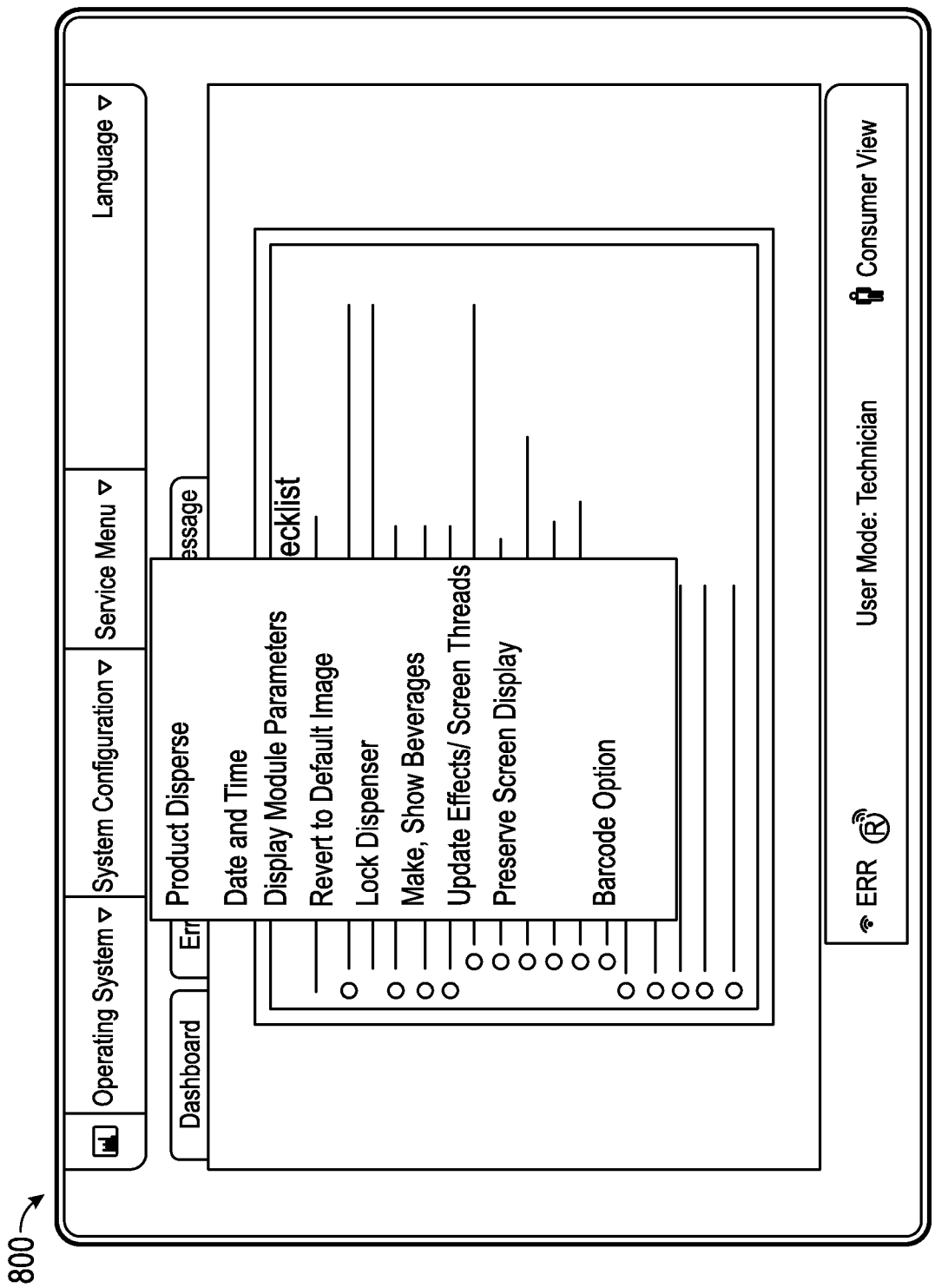
FIG. 8 shows a system configuration screen.
Figure 9:
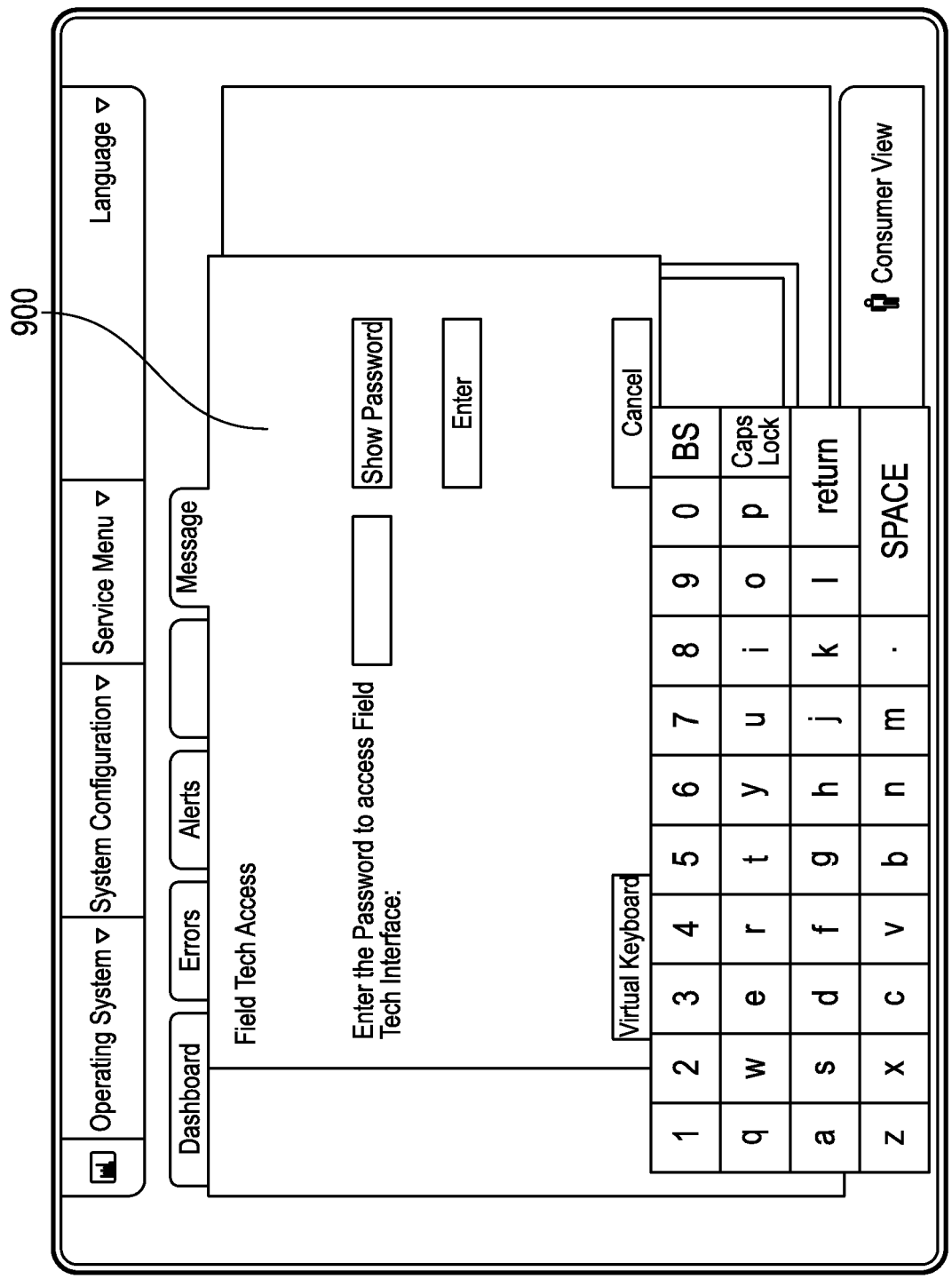
FIG. 9 shows a security screen.
Figure 10A:
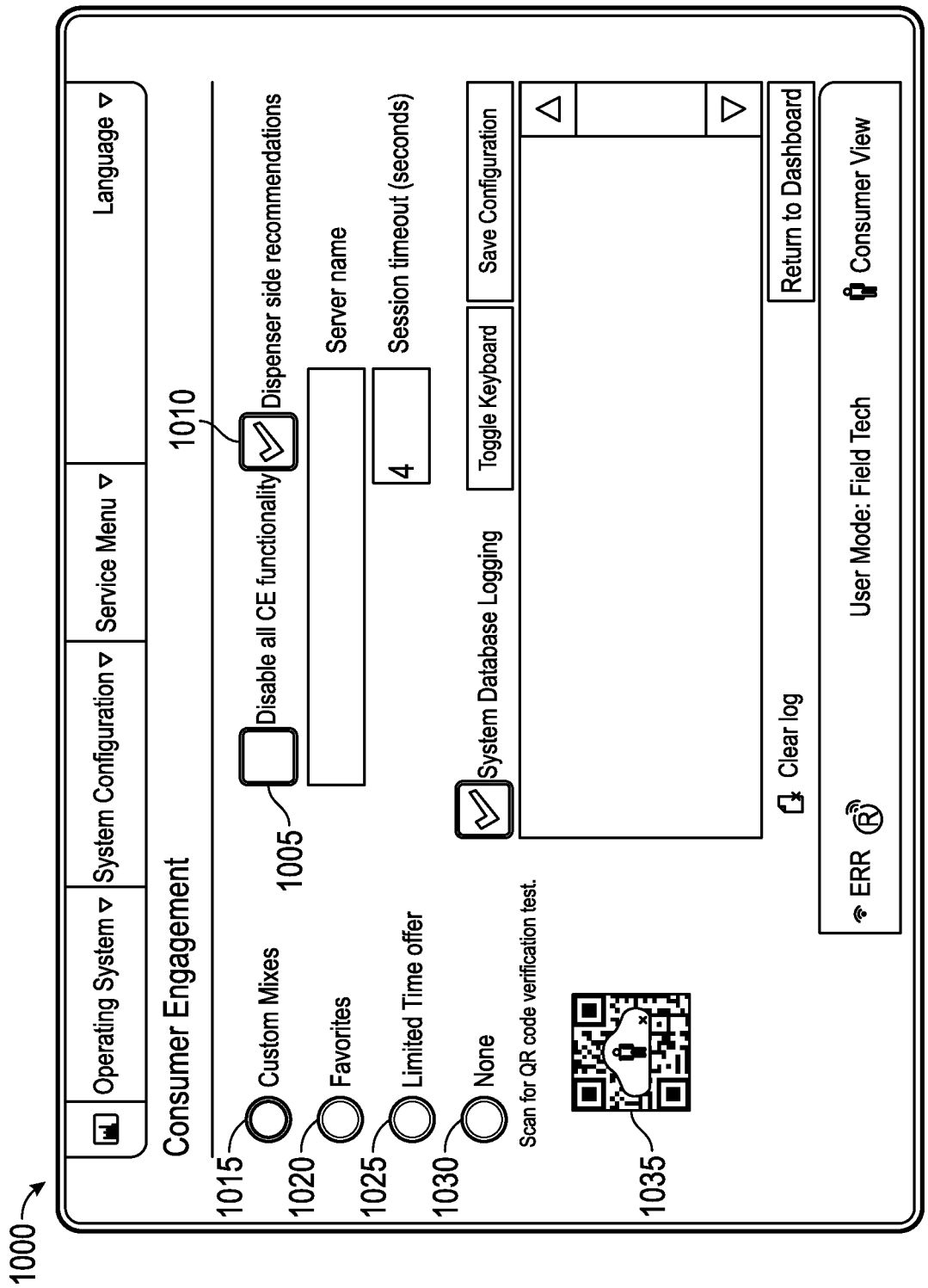
FIG. 10A shows a consumer engagement screen.

In order to select when and/or how promotional screen 700 may be displayed on display 124, the operator of consumer electronic device 104 may navigate to a system configuration screen 800 as shown in FIG. 8. From system configuration screen 800, the operator of consumer electronic device 104 may navigate through a security screen 900 shown in FIG. 9 to a consumer engagement screen 1000 shown in FIG. 10A. At consumer engagement screen 1000, the operator may select disable all CE functions 1005, which may cause application 130 not to display promotion screen 700. In addition, selecting disable all CE functions 1005 may cause application 130 not to display bar code 540 in user interface 500. Consumer engagement screen 1000 may allow the operator of consumer electronic device 104 to select times of the day to enable or disable all CE functions.

Consumer engagement screen 1000 may allow the operator to select where to run the aforementioned recommendation process for calculating beverage recommendations for recommended section 720. For example, if the operator selects dispenser side recommendations 1010, the aforementioned recommendation process may run on consumer electronic device 104. Or if the operator leaves dispenser side recommendations 1010 unselected, the aforementioned recommendation process may run on server 106.

Figure 10B:
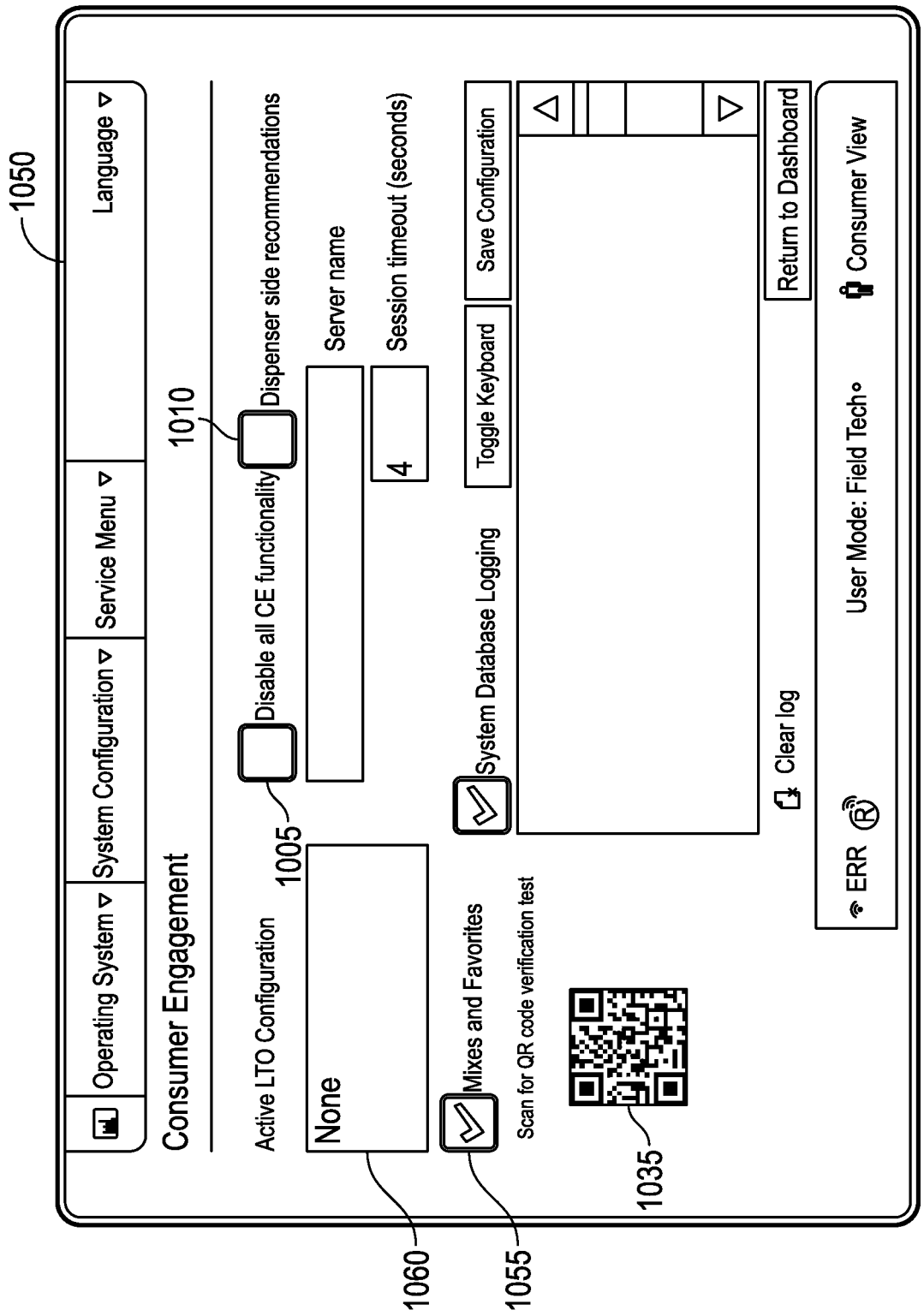
FIG. 10B shows a consumer engagement screen.

Consumer engagement screen 1000 may allow the operator to select certain sections of promotion screen 700 to disable or enable. The operator may select custom mixes 1015, which may allow custom mixes section 710 to be displayed on promotional screen 700. In addition, the operator may select favorites 1020, which may allow favorites section 715 to be displayed on promotional screen 700. Furthermore, the operator may select limited time offer 1025, which may allow limited time offer section 705 to be displayed on promotional screen 700. Moreover, the operator may select none 1030, which may disable limited time offer section 705, custom mixes section 710, and favorites section 715 from being displayed on promotional screen 700. Consumer engagement screen 1000 may allow the operator of consumer electronic device 104 to select times of the day to enable or disable limited time offer section 705, custom mixes section 710, favorites section 715, and/or recommended section 720. Application 130 may display an indicia 1035 (e.g. a QR code) on display 124 to indicate that consumer electronic device 104 is connected to server 106. Application 130 may not display indicia 1035 when consumer electronic device 104 is not connected to server 106. FIG. 10B shows a consumer engagement screen 1050 that may be similar to consumer engagement screen 1000. As shown in FIG. 10B, consumer engagement screen 1050 may include a mixes and favorites 1055 selection. Mixes and favorites 1055 may combine the aforementioned functionality of custom mixes 1015 and favorites 1020 as described above with respect to FIG. 10A.

In addition, consumer engagement screen 1050 may include an active LTO configuration box 1060. As stated above, promotional screen 700 may comprise a limited time offer section 705 having user selectable elements corresponding to a limited time offer. Consistent with embodiments of the disclosure, one or more limited time offer may be displayed on promotional screen 700. Each limited time offer may have corresponding one of more user selectable elements that may correspond to beverages for example. Active LTO configuration box 1060 may list one or more limited time offers. Promotional screen 700 may display the one or more limited time offers selected by the operator from the one or more limited time offers listed in active LTO configuration box 1060.

Server 106 may push the one or more limited time offers to consumer electronic device 104. The one or more limited time offers may correspond to a particular time period (e.g. quarter of a year.) Then the operator of consumer electronic device 104 may determine which of the one or more limited time offers the operator wishes to display in promotional screen 700 by making one or more selections within active LTO configuration box 1060. The process described above with respect to FIG. 8, FIG. 9, FIG. 10A, and FIG. 10B may, in addition to being performed locally at consumer electronic device 104, may be performed remotely (e.g. from server 106.)

Figure 11:
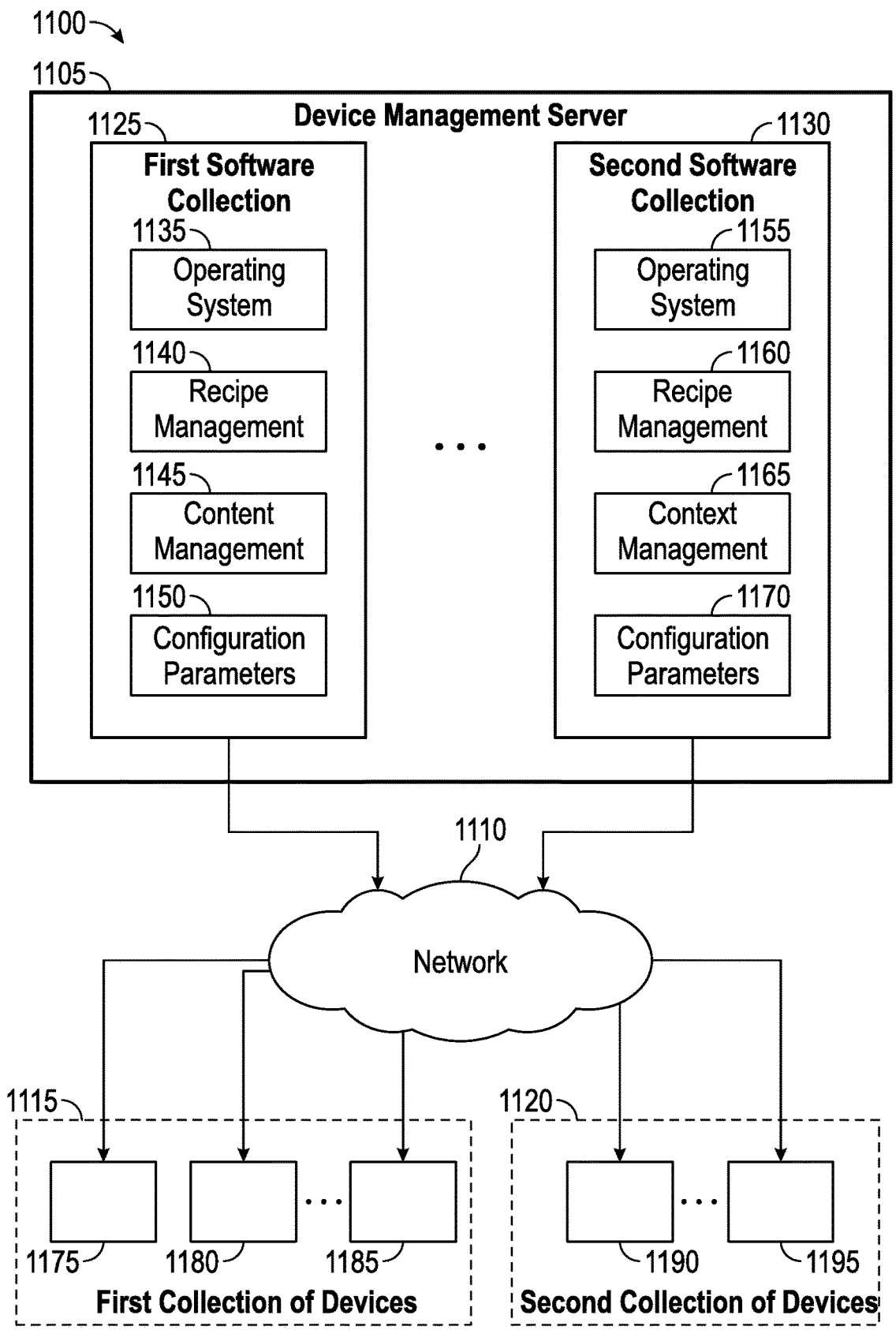
FIG. 11 shows a software distribution system.

FIG. 11 shows a software distribution system 1100 for distributing software to consumer electronic devices such as consumer electronic device 104. As shown in FIG. 11, software distribution system 1100 may comprise a device management server 1105, a network 1110, a first collection of devices 1115, and a second collection of devices 1120. Device management server 1105 may be practiced in an operating environment such as electronic device 1500 as described with respect to FIG. 15. Network 1110 may comprise any network capable of transporting data such as, for example, the Internet.

Device management server 1105 may update, store, and distribute a plurality of software collections. The plurality of software collections may comprise, but are not limited to, a first software collection 1125 and a second software collection 1130. The plurality of software collections may comprise any number of software collections and is not limited to two. First software collection 1125 may comprise a plurality of software modules comprising, for example, a first collection operating system 1135, a first collection recipe management system 1140, a first collection content management system 1145, and first collection configuration parameters 1150. Second software collection 1105 may comprise a plurality of software modules comprising, for example, a second collection operating system 1155, a second collection recipe management system 1160, a second collection content management system 1165, and second collection configuration parameters 1170. Configuration parameters may comprise, but are not limited to: i) show/hide water; ii) soft/hard ice; iii) consumer engagement on/off; and iv) enable/disable promotions. Software modules may comprise, but are not limited to: i) an operating system; ii) a recipe management system; and iii) a content management system.

First collection of devices 1115 may comprise a first plurality of consumer electronic devices such as, but not limited to, a first collection first consumer electronic device 1175, a first collection second consumer electronic device 1180, and a first collection third consumer electronic device 1185. Each of the first plurality of consumer electronic devices may comprise, but are not limited to, consumer electronic device 104. Second collection of devices 1120 may comprise a second plurality of consumer electronic devices such as, but not limited to, a second collection first consumer electronic device 1190 and a second collection second consumer electronic device 1195. Each of the second plurality of consumer electronic devices may comprise, but are not limited to, consumer electronic device 104. Each of first collection of devices 1115 and second collection of devices 1120 may comprise any number of consumer electronic devices.

Consumer electronic devices within first collection of devices 1115 and second collection of devices 1120 may have attributes. These attributes may comprise, but are not limited to: i) a customer ID for an operator of the consumer electronic device; ii) a chain ID (e.g. movie theater brand, a restaurant brand, etc.) for an operator of the consumer electronic device; iii) a location (e.g. country) of the consumer electronic device; iv) a language for the consumer electronic device; and v) an equipment type of the consumer electronic device. Consequently, consumer electronic devices within system 1100 may be separated into mutually exclusive groups (e.g. first collection of devices 1115 and second collection of devices 1120) based on desired attributes associated with each group.

Each device within first collection of devices 1115 may have a first set of attributes that may be the same for each device within first collection of devices 1115. Accordingly, software to run each device within first collection of devices 1115 may be the same. Moreover, each device within second collection of devices 1120 may have a second set of attributes that may be the same for each device within second collection of devices 1120. Accordingly, software to run each device within second collection of devices 1120 may be the same. Consequently, first software collection 1125 may be maintained on device management server 1105 for distribution to each device within first collection of devices 1115. Similarly, second software collection 1130 may be maintained on device management server 1105 for distribution to each device within second collection of devices 1120.

Figure 12:
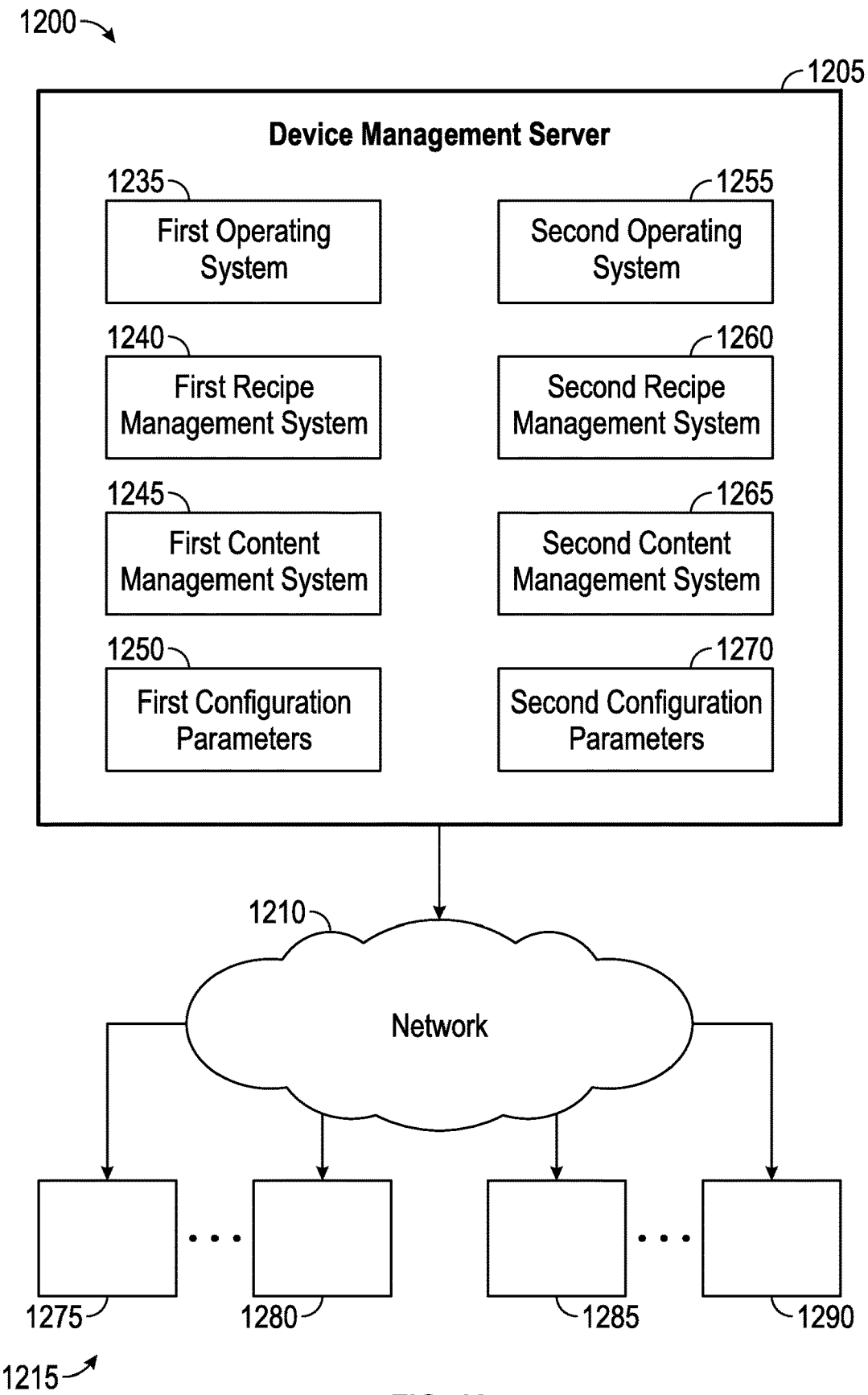
FIG. 12 shows a software distribution system.

FIG. 12 shows a software distribution system 1200 for distributing software to consumer electronic devices such as consumer electronic device 104. As shown in FIG. 12, software distribution system 1200 may comprise a device management server 1205, a network 1210, and a plurality of devices 1215. Device management server 1205 may be practiced in an operating environment such as electronic device 1500 as described with respect to FIG. 15. Network 1210 may comprise any network capable of transporting data such as, for example, the Internet.

Device management server 1205 may update, store, and distribute a plurality of software modules selected from a group of software modules on device management server 1205. The plurality of software modules may comprise, but are not limited to, a first operating system 1235, a first recipe management system 1240, a first content management system 1245, and first configuration parameters 1250. The plurality of software modules may further comprise a second operating system 1255, a second recipe management system 1260, a second content management system 1265, and second configuration parameters 1270.

Plurality of devices 1215 may comprise, but are not limited to, a first consumer electronic device 1275, a second consumer electronic device 1280, a third consumer electronic device 1285, and a forth consumer electronic device 1290. Each of plurality of devices 1215 may comprise, but are not limited to, consumer electronic device 104. Plurality of devices 1215 may comprise any number of devices and is not limited to four.

In software distribution system 1100 of FIG. 11, all software modules may be maintained in collections (e.g. first software collection 1125 and second software collection 1130) and may be sent out in collections. However, in device management system 1200 of FIG. 12, all software modules may be maintained individually and may be sent out in a individually. Furthermore, in contrast with system 1100, plurality of devices 1215 may not be placed into mutually exclusive groups. Rather device management system 1200 may maintain a record of attributes for each device in plurality of devices 1215 and, based on a device's attributes, distribute software modules accordingly. For example, based on it's desired attributes, first consumer electronic device 1275 may be sent first operating system 1235, second recipe management system 1260, first content management system 1245, and second configuration parameters 1270. Similarly, based on it's desired attributes, second consumer electronic device 1280 may be sent first operating system 1235, first recipe management system 1240, first content management system 1245, and first configuration parameters 1250. In addition, based on it's desired attributes, third consumer electronic device 1285 may be sent second operating system 1255, second recipe management system 1260, second content management system 1265, and second configuration parameters 1270. And based on it's desired attributes, forth consumer electronic device 1290 may be sent second operating system 1255, first recipe management system 1240, second content management system 1265, and first configuration parameters 1250.

Figure 13:
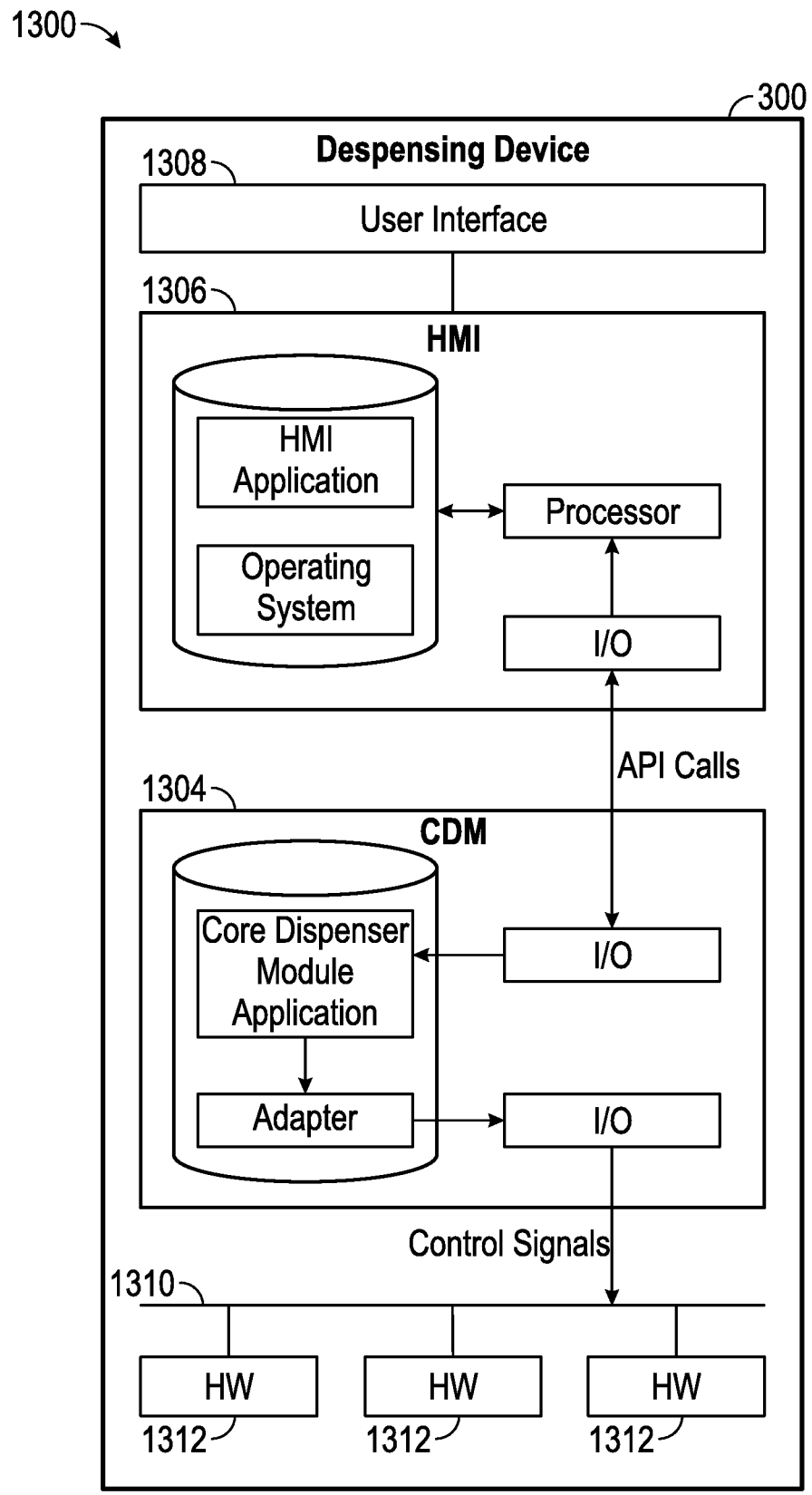
FIG. 13 shows a control architecture.

FIG. 13 shows a control architecture 1300 that may be used to control, for example, dispensing device 300 of FIG. 3. As shown in FIG. 13, control architecture 1300 may comprise a core dispense module (CDM) 1304, a human machine interface (HMI) module 1306, a user interface (UI) 1308, and a machine bus (MBUS) 1310. HMI 1306 may connect to or otherwise interface and communicate with at least one external device (e.g. mobile computing device 102) being external to dispensing device 300. HMI 1306 may also control and update display screens on UI 1308. CDM 1304 may control flows from a plurality of pumps and/or valves 1312 in dispensing device 300 according to a recipe to mix and dispense a product (e.g. a beverage) from dispensing device 300.

Beverage components (i.e. beverage bases or beverage base components and flavors) may be combined, along with other ingredients, to dispense various products that may include beverages or blended beverages (i.e. finished beverage products) from dispensing device 300. However, dispensing device 300 may also be configured to dispense beverage components individually. Dispensing device 300 may be configured to dispense beverage base components to form a beverage base or finished beverage. The other beverage ingredients may include diluents such as still or carbonated water, functional additives, or medicaments, for example.

An example of control architecture 1300 for dispensing device 300 may be described in U.S. Patent Application Ser. No. 61/987,020, titled Dispenser Control Architecture, filed on May 1, 2014, the entirety of which is hereby incorporated by reference. MBUS 1310 may facilitate communication between HMI module 1306 and CDM 1304. HMI module 1306, MBUS 1310, and CDM 1304 may collectively comprise common core components, implemented as hardware or as combination of hardware and software, which may be adapted to provide customized functionality in dispensing device 300. Dispensing device 300 may further include memory storage and a processor. Examples of UI 1308 may be described in U.S. Patent Application Ser. No. 61/877,549, titled Product Categorization User Interface for a Dispensing Device, filed on Sep. 13, 2013, the entirety of which is hereby incorporated by reference.

UI 1308 may detect what area of a touch screen has been touched by a user (e.g. user 108.) In response, UI 1308 may send HMI module 1306 data regarding where the touch screen was touched. In response, HMI module 1306 may interpret this received data to determine whether to have UI 1308 display a different UI screen or to issue a command to CDM 1304. For example, HMI module 1306 may determine that the user touched a portion of the touch screen corresponding to a beverage brand. In response, HMI module 1306 may issue a command to CDM 1304 to pour the corresponding beverage brand. Or HMI module 1306 may determine that the user touched a portion of the touch screen corresponding to a request for another screen. In response, HMI module 1306 may cause UI 1308 to display the requested screen.

In some embodiments, UI 1308 in dispensing device 300 may be utilized to select and individually dispense one or more beverages. The beverages may be dispensed as beverage components in a continuous pour operation whereby one or more selected beverage components continue to be dispensed while a pour input is actuated by a user or in a batch pour operation where a predetermined volume of one or more selected beverage components are dispensed (e.g. one ounce at a time). UI 1308 may be addressed via a number of methods to select and dispense beverages. For example, a user may interact with UI 1308 via touch input to navigate one or more menus from which to select and dispense a beverage. As another example, a user may type in a code using an onscreen or physical keyboard (not shown) on dispensing device 300 to navigate one or more menus from which to select and dispense a beverage.

UI 1308, which may include a touch screen and a touch screen controller, may be configured to receive various commands from a user (i.e. consumer input) in the form of touch input, generate a graphics output and/or execute one or more operations with dispensing device 300 (e.g. via HMI module 1306 and/or CDM 1304), in response to receiving the aforementioned commands. A touch screen driver in HMI module 1306 may be configured to receive the consumer or customer inputs and generate events (e.g. touch screen events) that may then be communicated through a controller to an operating system of HMI module 1306.

Dispensing device 300 may be in communication with one or more external device (e.g. mobile computing device 102). In some embodiments, the communication between dispensing device 300 and the external device may be accomplished utilizing any number of communication techniques including, but not limited to, near-field wireless technology such as BLUETOOTH, Wi-Fi and other wireless or wireline communication standards or technologies, via a communication interface.

Figure 14:
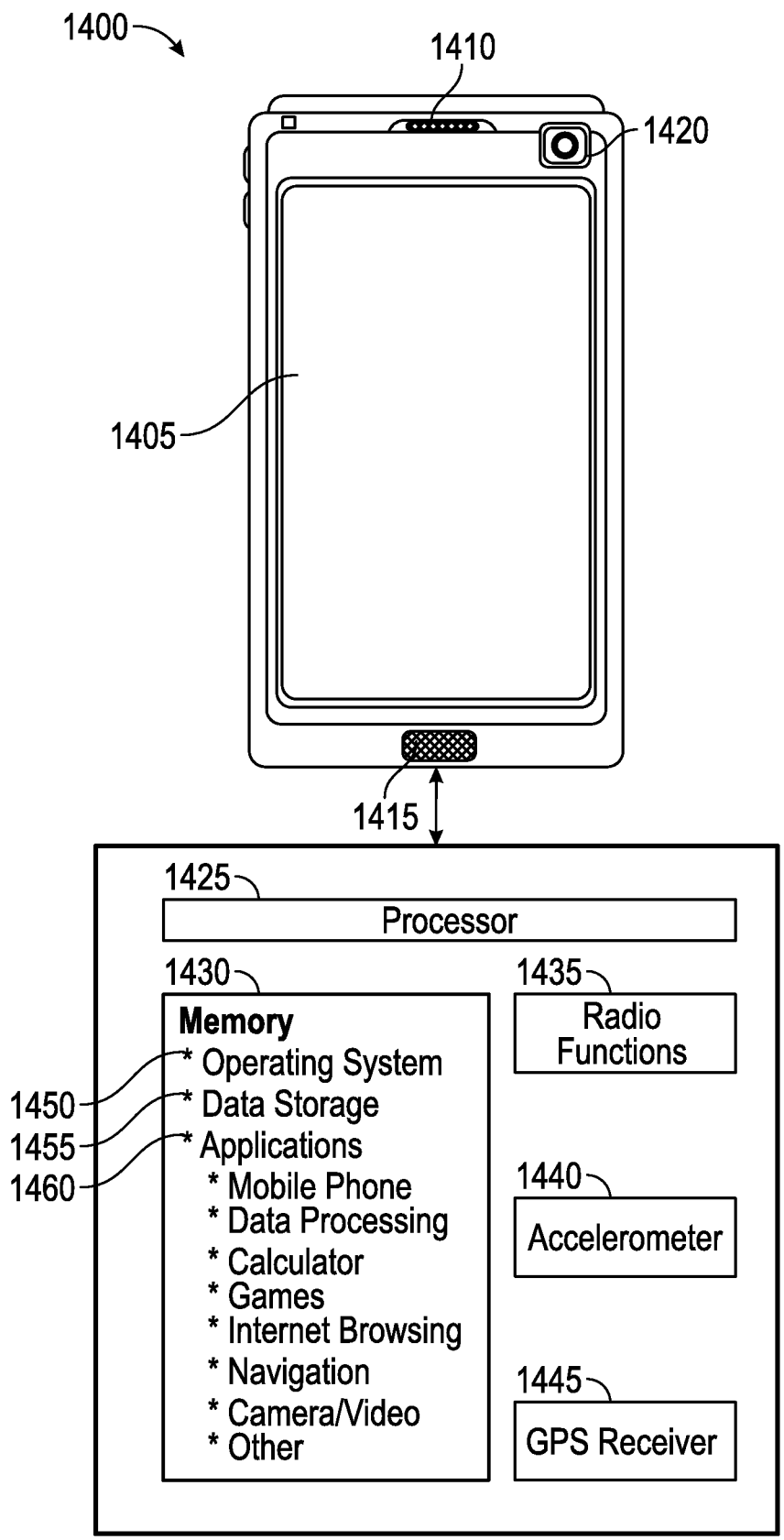
FIG. 14 shows a mobile computing environment.

FIG. 14 shows a mobile computing environment 1400 that mobile computing device 102 may operate within. For example, mobile computing environment 1400 may comprise, but is not limited to, a smartphone, a tablet personal computer, or a laptop computer. Mobile computing environment 1400 may comprise a handheld computer having both input elements and output elements. Input elements may include touch screen display 1405 that may allow the user to enter information into mobile computing environment 1400, a microphone 1415, and a camera 1420. Mobile computing environment 1400 may incorporate additional input elements such as a physical keypad (not shown). A soft keypad (not shown) may also be generated on touch screen display 1405.

Touch screen display 1405 on mobile computing environment 1400 may also comprise an output element that can display a graphical user interface (GUI). Other output elements include a speaker 1410. Additionally, mobile computing environment 1400 may incorporate a vibration module (not shown), which may cause mobile computing environment 1400 to vibrate to notify the user of an event. Mobile computing environment 1400 may incorporate a headphone jack (not shown) for providing output signals.

Mobile computing environment 1400 may comprise a number of other components. The components may include a processor 1425, a memory 1430, radio functions 1435, an accelerometer 1440, and a GPS receiver 1445. Memory 430 may be utilized for storing an operating system 1450 and may include a data storage 1455. Memory 1430 may also include a number of applications 1460 including, but not limited to, a mobile phone application, a data processing application, a calculator, games, an Internet browser, navigation a camera/video application and other applications such as application 110 that may be utilized for facilitating an individualized interaction with consumer electronic device 104 as discussed above. Radio functions 1435 may support short range wireless communications via NFC, BLUETOOTH wireless technology, Wi-Fi or other wireless technologies. Radio functions 1435 may also be utilized to connect to the Internet (or other types of networks) as well as to remote computing systems.

Figure 15:
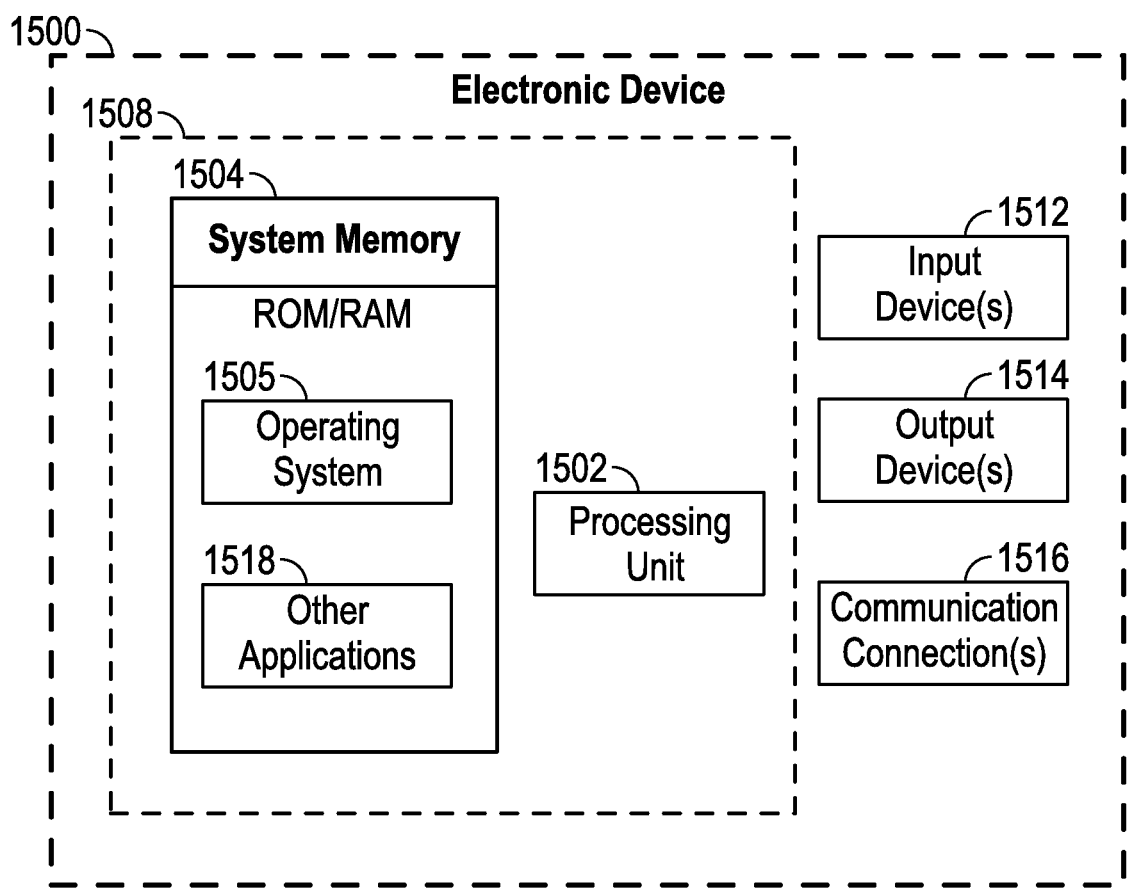
FIG. 15 shows an electronic device.

FIG. 15 shows electronic device 1500 that may provide an operating environment for consumer electronic device 104 or server 106 for example. Electronic device 1500 may comprise a computing device that may include at least one processing unit 1502 and a system memory 1504. Depending on the configuration and type of computing device, system memory 1504 may comprise, but is not limited to, volatile (e.g. random access memory (RAM)), non-volatile (e.g. read-only memory (ROM)), flash memory, or any combination. System memory 1504 may include an operating system 1505 and other applications 1518. Operating system 1505 may be suitable for controlling electronic device 1500's operation.

Electronic device 1500 may have additional features or functionality. For example, electronic device 1500 may also include additional data storage devices (not shown) that may be removable and/or non-removable such as, for example, magnetic disks, optical disks, solid state storage devices (SSD), flash memory or tape. Electronic device 1500 may also have input device(s) 1512 such as a keyboard, a mouse, a pen, a sound input device (e.g., a microphone), a touch input device, etc. Output device(s) 1514 such as a display, speakers, a printer, etc. may also be included. The aforementioned devices are examples and others may be used. Communication connection(s) 1516 may also be included and utilized to connect to the Internet (or other types of networks) as well as to remote computing systems.

Embodiment, for example, may be implemented as a computer process (method), a computing system, or as an article of manufacture, such as a computer program product or computer readable media. The computer program product may be a computer storage media readable by a computer system and encoding a computer program of instructions for executing a computer process.

Computer readable media may include computer storage media. Computer storage media may include volatile and nonvolatile, removable and non-removable media implemented in any method or technology for storage of information (such as computer readable instructions, data structures, program modules, or other data) in hardware. System memory 1504 (as well as memory 1430) may be an example of computer storage media (e.g. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium that can be used to store information.

Computer readable media may also include communication media. Communication media may be embodied by computer readable instructions, data structures, program modules, or other data in a modulated data signal, such as a carrier wave or other transport mechanism, and includes any information delivery media. Modulated data signal may describe a signal that may have one or more characteristics set or changed in such a manner as to encode information in the signal. Communication media may include wired media such as a wired network or direct-wired connection, and wireless media such as acoustic, radio frequency (RF), infrared, and other wireless media.

A beverage may include, but is not limited to, pulp and pulp-free citrus and non-citrus fruit juices, fruit drink, vegetable juice, vegetable drink, milk, soy milk, protein drink, soy-enhanced drink, tea, water, isotonic drink, vitamin-enhanced water, soft drink, flavored water, energy drink, coffee, smoothies, yogurt drinks, hot chocolate and combinations thereof. The beverage may also be carbonated or non-carbonated. The beverage may comprise beverage components (e.g., beverage bases, colorants, flavorants, and additives).

A beverage base may comprise parts of the beverage or the beverage itself prior to additional colorants, additional flavorants, and/or additional additives. Beverage bases may include, but are not limited to syrups, concentrates, and the like that may be mixed with a diluent such as still or carbonated water or other diluent to form a beverage. The beverage bases may have reconstitution ratios of about 3:1 to about 6:1 or higher. Beverage bases may comprise a mixture of beverage base components.

A beverage base component may be included in beverage bases. The beverage base component may comprise parts of beverages that may be considered food items by themselves. The beverage base components may be micro-ingredients such as an acid portion of a beverage base, an acid-degradable and/or non-acid portion of a beverage base, natural and artificial flavors, flavor additives, natural and artificial colors, nutritive or non-nutritive natural or artificial sweeteners, additives for controlling tartness (e.g. citric acid or potassium citrate), functional additives such as vitamins, minerals, or herbal extracts, nutraceuticals, or medicaments. The micro-ingredients may have reconstitution ratios from about 10:1, 20:1, 30:1, or higher with many having reconstitution ratios of 50:1 to 300:1. The viscosities of the micro-ingredients may range from about 1 to about 100 centipoise.

Thus, for the purposes of requesting, selecting, or dispensing a beverage base, a beverage base formed from separately stored beverage base components may be equivalent to a separately stored beverage base. For the purposes of requesting, selecting or dispensing a beverage, a beverage formed from separately stored beverage components may be equivalent to a separately stored beverage.

Separately stored may comprise that the components may be kept separate until combined. For instance, the components may be separately stored individually in a container or package or instead may be all stored in one container or package wherein each component is individually packaged (e.g. plastic bags) so that they do not blend while in the container or package. The container or package, itself, may be individual, adjacent to, or attached to another container or package. A blended beverage may include final products wherein two or more beverages have been blended or mixed or otherwise combined to form a final product.

The product ingredients may include beverage bases or beverage base components (e.g., concentrated syrups) as well as flavors (i.e., flavoring agents, flavor concentrates, or flavor syrups), which may be separately stored or otherwise contained in individual removable containers. Each of the beverage bases or beverage base components and each of the flavors may be separately stored or otherwise contained in individual removable containers, cartridges, packages or the like that may generally be referred to simply as a package or ingredients package.

Embodiments are described above with reference to block diagrams and/or operational illustrations of methods, systems, and computer program products. The operations/acts noted in the blocks may be skipped or occur out of the order as shown in any flow diagram. For example, two or more blocks shown in succession may be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments.

What is claimed is:

1. A kiosk configured to provide consumer products and/or services, comprising:
    a display; and
    a memory;
    wherein the kiosk is configured to perform operations comprising:
    providing a device identification identifying the kiosk, wherein the device identification is configured to be scanned by a mobile computing device associated with a user interacting with the kiosk;
    receiving, at the kiosk an event notification based upon the provided device identification, the event notification being received from a server after the server receives the device identification directly from the mobile computing device; and
    displaying, on the display at the kiosk and in response to receiving the event notification, a promotional screen comprising personalized content to the user and a limited time offer section displaying a limited time offer based on the received event notification.

2. The kiosk of claim 1, further configured to perform operations comprising:
    displaying, at the kiosk, a consumer engagement screen configured to solicit input data for configuring the promotional screen;
    receiving input data in response to the displayed consumer engagement screen; and
    displaying the promotional screen configured according to the received input data.

3. The kiosk of claim 2, wherein the received input data is received from an operator of the kiosk, and wherein the event notification comprises a user identification (ID) and preference data associated with the user.

4. The kiosk of claim 1, wherein the device identification comprises a bar code.

5. The kiosk of claim 4, further comprising displaying the bar code on the consumer electronic device.

6. The kiosk of claim 1, wherein the device identification comprises a bar code provided on a display of the kiosk.

7. The kiosk of claim 1, wherein the kiosk comprises a beverage dispensing device.

8. The kiosk of claim 1, wherein the event notification comprises a user identification (ID) and preference data.

9. The kiosk of claim 8, wherein the user ID and preference data are associated with the user and are provided, along with the device identification, by the mobile computing device to the server.

10. The kiosk of claim 1, wherein displaying the promotional screen comprises displaying the promotional screen only during a predetermined time period.

11. The kiosk of claim 10, wherein the predetermined time period comprises an on peak time period for an operator of the kiosk.

12. The kiosk of claim 1, wherein the device identifier is physically affixed to the kiosk.

13. The kiosk of claim 1, wherein the kiosk comprises a vending machine.

14. A method performed at a kiosk, comprising:
    providing a device identification identifying the kiosk, wherein the device identification is configured to be scanned by a mobile computing device associated with a user interacting with the kiosk;
    receiving, at the kiosk, an event notification based upon the provided device identification, the event notification being received from a server after the server receives the device identification from the mobile computing device; and
    displaying, at the kiosk and in response to receiving the event notification, a promotional screen comprising personalized content to the user and a limited time offer section displaying a limited time offer based on the received event notification.

15. The method of claim 14, wherein providing a device identification identifying the kiosk comprises one or more of:
    displaying the device identification on a display of the kiosk;
    displaying the device identification on a surface the kiosk.

16. The method of claim 14, further comprising:
    utilizing a server push technology to initiate and keep open a network connection with the server.

17. The method of claim 14, wherein displaying a promotional screen comprising personalized content to the user comprises displaying one or more of:
    a selection of the user's favorite beverages that may be available for purchase; advertisements targeted towards the user's favorite products.

18. The method of claim 14, wherein displaying a limited time offer section comprises displaying a beverage available for selection by the user.

* * * * *